United States Patent [19]

Moore

[11] E Re. 31,015

[45] Reissued Aug. 24, 1982

[54] REEL ADAPTER FOR TIE MATERIAL AND METHOD OF USING SAME

[75] Inventor: Doyle A. Moore, Worthington, Minn.

[73] Assignee: Bedford Industries, Inc., Worthington, Minn.

[21] Appl. No.: 189,378

[22] Filed: Sep. 22, 1980

Related U.S. Patent Documents

Reissue of:

[64] Patent No.: 4,117,988
Issued: Oct. 3, 1978
Appl. No.: 678,923
Filed: Apr. 21, 1976

[51] Int. Cl.[3] ..... B65H 75/18; B65H 75/22

[52] U.S. Cl. ..... 242/71.9; 242/71.8; 242/72.1

[58] Field of Search ..... 242/71.9, 71.8, 73, 242/68, 68.1, 68.2, 68.3, 72.1, 46.2, 46.3, 46.4, 110, 110.1, 115, 116, 118.4, 118.5

[56] References Cited

U.S. PATENT DOCUMENTS

| | | | |
|---|---|---|---|
| 586,167 | 7/1897 | Dudley . | |
| 687,443 | 11/1901 | Succie . | |
| 712,536 | 11/1902 | Hill | 242/46.4 X |
| 713,870 | 11/1902 | Gally . | |
| 859,391 | 7/1907 | Lemenager . | |
| 936,306 | 10/1909 | Cole . | |
| 958,214 | 5/1910 | Bayer . | |
| 1,059,042 | 4/1913 | Davis . | |
| 1,196,794 | 9/1916 | McCormick . | |
| 2,115,912 | 5/1938 | Helmond . | |
| 2,127,772 | 8/1938 | Horn et al. | 242/71.9 |
| 2,489,108 | 11/1949 | Schmidt . | |
| 2,518,533 | 8/1950 | Edwards | 242/71.8 |
| 2,529,185 | 11/1950 | Proctor . | |
| 2,580,749 | 1/1952 | Fischer . | |
| 2,733,873 | 2/1956 | Petersen | 242/72.1 |
| 2,739,765 | 3/1956 | Pierce . | |
| 2,746,689 | 5/1956 | Berkepeis | 242/46.3 |
| 2,861,754 | 11/1958 | Pitt . | |
| 2,916,225 | 12/1959 | Swallow et al. . | |
| 3,017,132 | 1/1962 | Gnage et al. | 242/71.9 |
| 3,081,960 | 3/1963 | Howe . | |
| 3,139,243 | 6/1964 | Warwick et al. | 242/156.2 |
| 3,245,631 | 4/1966 | Pitts . | |
| 3,288,391 | 11/1966 | Keesling . | |
| 3,295,778 | 1/1967 | Fiorentino et al. | 242/71.9 X |
| 3,306,550 | 2/1967 | Ewing . | |
| 3,432,021 | 3/1969 | Morelli . | |
| 3,904,147 | 9/1975 | Taitel et al. | 242/156.2 |
| 4,037,769 | 7/1977 | Meyers . | |

*Primary Examiner*—Stanley N. Gilreath
*Attorney, Agent, or Firm*—Robert C. Baker

[57] ABSTRACT

An adapter is provided consisting of a tubular center section and a pair of circular flange sections at each end of the tubular center section. One of the flanges is removable so that coils of tie material such as string, cord, wire, or plastic or paper covered wire and the like can be placed on the adapter and the flange replaced. The tube is segmented circumferentially and can be expanded to tightly engage the inside surface of the coil. One of the flanges floats axially on the adapter and is resiliently biased in the direction of the other flange to tightly engage the side surfaces of the wound up coil.

17 Claims, 4 Drawing Figures

REEL ADAPTER FOR TIE MATERIAL AND METHOD OF USING SAME

Matter enclosed in heavy brackets [ ] appears in the original patent but forms no part of this reissue specification; matter printed in italics indicates the additions made by reissue.

FIELD OF THE INVENTION

The invention relates to a method and means for holding coils of elongated tie material and more particularly to a reel adapter of the type which can be partially disassembled for replacing or removing coils or reels of wound material thereupon.

[THE PRIOR ART]

In recent years tie ribbon, much of which is manufactured from wire embedded in plastic, has been used on an ever increasing scale for tying packages such as bread bags. Previously, tie material or ribbon of this kind was stored on unitary spools which consist of a tube having two circular flanges, one connected permanently to each end of the tube. These spools in addition to being expensive produce a handling problem and the accumulation of large numbers of used spools produces a disposal problem. The reels previously used required the end flanges to hold the coils of tie material securely and prevent them from becoming unraveled or collapsing. Now it has been found possible to use a tubular spool with no end flanges or in some cases an entirely spoolless coil of tie ribbon by twisting the ribbon periodically during the winding operation to make a more secure coil and to render the coil stable. Thus, by twisting the tie ribbon at each edge of the coil or cylinder of wound material it can be rendered relatively stable as will be understood by those skilled in the art. This system of winding which has been used in the textile industry can be thought of as a twist winding system. However, even though quite stable, the wound coils or cylinders of tie material can still become misshaped or unravel when unwound. Moreover, when unwound, the coil of material must be held with a constant frictional drag to resist the unwinding force applied by the tension on the length of material being unwound. Thus a problem found in the development of the present invention is that spools must be securely engaged to provide the proper frictional drag. However, the engagement of the adapter with the inside surface of the coil can interfere with the engagement or retention of the flat side surfaces of the coil as required to prevent the coil from falling apart or collapsing.

Thus, one phase of the present invention concerns the provision of an expandable means for engaging the inside cylindrical surface of the coil but because of the slight variations in the thickness of the coil from one flat surface to the other, the tightening of the adapter for the purpose of frictionally engaging the inside surface of the coil could also press the end flanges too tightly against the wound coil preventing interior engagement. Therefore, there is a need to securely and firmly hold the flat end flanges against the flat corresponding surfaces of the wound coil of material to prevent the coil from falling apart or becoming unraveled while at the same time firmly engaging the inside cylindrical surface of the coil so that it will not be free to rotate on the adapter and the adapter can consequently be utilized to apply a controlled frictional drag as material is unwound.

OBJECTS

The major objects are to provide an adapter in the nature of a spool which (a) can be disassembled i.e., can be separated into parts for the mounting or removal of coils of wound material, (b) includes a means for engaging a coil of wound tie material on each of its flat end surfaces, (c) is capable of being used for supporting coils of wound tie material which are both spoolless or contain an interior tubular spool without ends, (d) includes a provision for firmly engaging the flat ends of the wound coil and applying a predetermined pressure to the flat ends of the coil to prevent the coil from collapsing or some winds on the coil from slipping off the end, (e) a provision for engaging the central portion of the adapter to the inside cylindrical surface of the coil to prevent the coil from turning on the adapter, (f) the provision of an expandable collet of cylindrical shape for engaging the inside surface of the coil of wound material when expanded to retain the coil in place on the adapter and prevent it from rotating with respect to the adapter, (g) a provision for tightening the collet when the flange used for engaging one surface of the coil is moved toward the other flange and a further provision for allowing the flanges at the ends of the adapter to remain a fixed distance apart, one floating as the collet is expanded to engage the inside surface of the coil to thereby [accomodate] *accommodate* coils of different widths.

THE FIGURES

SUMMARY OF THE [INVENION] *INVENTION*

Figure 1:
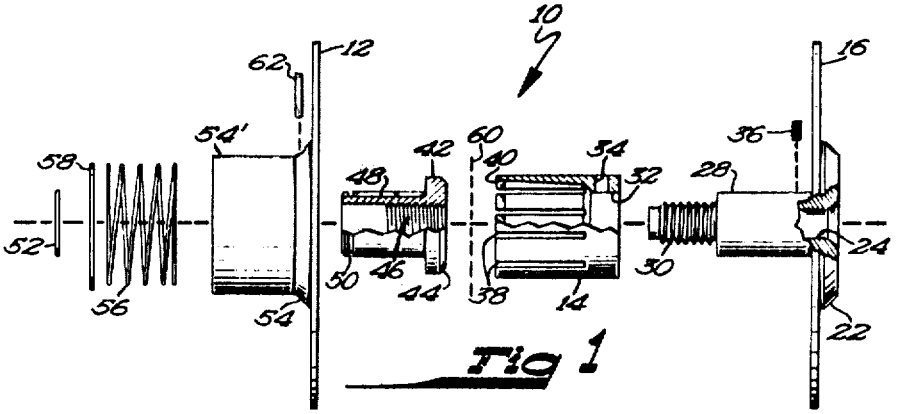
FIG. 1 is an exploded side elevational view of an adapter embodying the invention.

The invention provides a reel adapter and method for supporting and engaging a reel or coil of tie material such as a cord or wire tie ribbon. The adapter comprises a *tube having about it a* tubular body member and a pair of flat parallel axially spaced flanges extending normal to the tube. A fastening means is provided to removably secure one of the flanges to the tube so that the coil of tie material can be placed on the adapter and the flange replaced and secured in position on the [tubular body] *tube*. It is not critical where the separation is made between the tube *(plus the tubular body member about it)* and the flange. In one preferred form of the invention, for example, the flange separates from the *tube and a* tubular body section of the adapter at the end of the tube adjacent the center of the flange. It is, however, possible to have a portion of the tube *and tubular body member* connected to the flange so that when the flange is removed that portion of the tube [is] *and tubular body member are* also removed. In other words, the point of removal of the flange need not be located exactly at the junction between the flange and the *tube and the* tubular body [section] *member*.

*Preferably, the fastening means for the removable flange consists essentially of matingly threaded parts between the assembly of the removable flange, that is the removable*

*flange assembly, and the remaining structure of the adapter; and fastening is accomplished by manual threaded rotation of the entire removable flange assembly with respect to the remaining assembly or structure of the adapter.*

In a preferred form of the invention, the [tube] *tubular body member* includes *(i.e., a portion functions as)* a means for engaging the coil to prevent the coil from turning on the [tube] *tubular body member.* This is preferably accomplished by forming *a portion of* the [tube] *tubular body member* in sections which are capable of being moved outwardly against the inside surface of the coil or spool in case one is used. One preferred [form] *portion* of [tube] *tubular body member* includes a plurality of circumferentially spaced longitudinally extending slots which divide *the portion of* the [tube] *tubular body member* up into segments that are free at one end. In this form of the invention, *a portion of* the [tube] *tubular body member* can be thought of as an expandable collet the free ends of which are engagable with a corresponding mating surface of a collet expander that is associated with a removable flange. *Stated another way, the tubular body member in this form of the invention comprises an expandable collet having a plurality of longitudinally extending circumferentially spaced segments with notches between them, the segments being free at one end and integrally connected at the other end, and a collet expanding means operatively associated with the free ends of the segments to press the segments outward when the removable flange is moved in the direction of the other flange.* The removable flange is capable of moving along the axis of the tube and when so moved in the direction of the opposite flange, the collet expander will engage the free ends of the [tube] *collet* segments thereby spreading them outwardly into contact with the coil or spool.

Also in a preferred form of the invention at least one of the flanges is floating and is resiliently urged in the direction of the other flange to thereby tightly press against the flat side surfaces of the coil when the adapter is assembled.

*Additional features and relationships between flangeless coils of tie ribbon and the adapter, both from the standpoint of the method of supporting flangeless coils of tie ribbon on the adapter for a bag tying operation as well as from the apparatus standpoint where the flangeless coils and adapter are upon the bag typing machine shaft, will be evident as this description proceeds.*

DESCRIPTION OF THE PREFERRED EMBODIMENT

Figure 3:
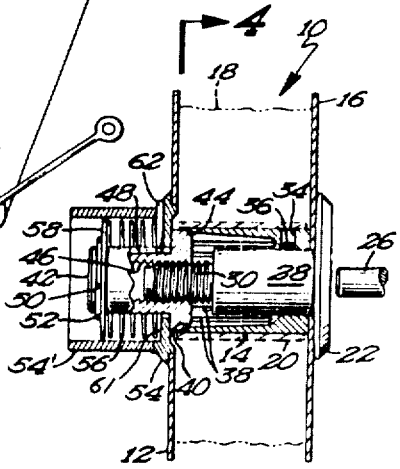
FIG. 3 is a vertical transverse sectional view taken on line 3—3 of FIG. 2.
Figure 4:
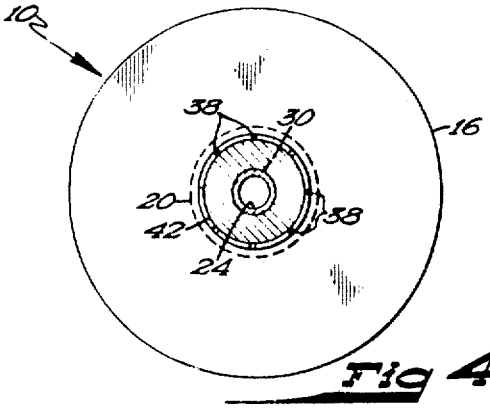
FIG. 4 is a vertical sectional view taken on line 4—4 of FIG. 3.

As shown in the Figures, an adapter in accordance with the invention is designated generally by the numeral 10. The adapter is composed of three major functional components comprising a left hand removable flange 12, a centrally located *tube having about it a* tubular body portion 14 and a right hand fixed flange 16. *(The most radially outer surface structure about tube section 28 is the tubular body portion 14. The "body" portion 14 is substantially cylindrical and coaxial about the tube 28.)* During use, as seen in FIG. 3 a coil of tie material such as plastic coated tie ribbon 18 is mounted upon the adapter with the left hand flange 12 abutting against one surface of the coil and the right hand flange 16 in contact with the other surface. The coil 18 is in this instance shown wound upon a rigid spool or core 20 which provides a certain amount of support before the coil 18 is put in place on the adapter. It will be seen that the inside surface of the core 20 is in contact with the outer surface of the tubular body *portion* 14.

Figure 2:
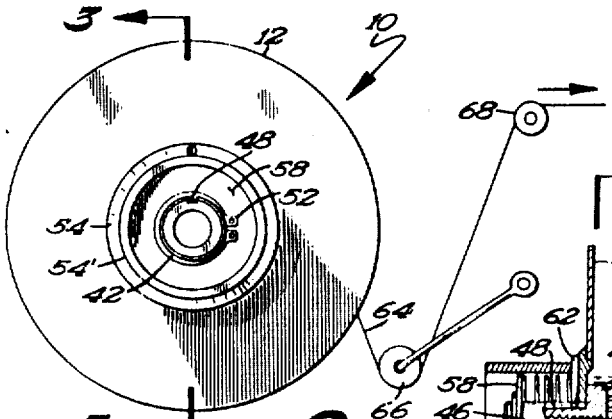
FIG. 2 is an end elevational view of the adapter when assembled as seen from the left end of FIG. 1.

The flanges 12 and 16 are both circular as seen in FIGS. 2 and 3. Flange 16 is rigidly secured as by welding to a flange hub 22 which is provided with a central bore 24 adapted to slide readily onto a shaft 26 of supporting machinery such as a tying machine of any known construction. The shaft 26 will normally be either 171 rotated by a motor (not shown) or] allowed to rotate with a certain predetermined degree of frictional resistance so that as the tie material of the coil 18 is unwound, the shaft 26 acting through the adapter 10 will exert a predetermined degree of resistance to the unwinding force exerted on the tie material.

The flange hub includes a threaded tube section 28 which is threaded at 30 adjacent its free end, the end furthest from the flange 16.

As seen in FIGS. 1 and 3, the tubular body section *14* is provided with a bore 32 of just the appropriate size to slide easily onto the threaded tube 28. It also includes a transverse bore 34 through which a set screw 36 extends to hold the tubular body *section 14* on the [tubular] *tube* portion 28 of the hub 22. The set screw 36 extends all the way to the central bore 24 and when tightened will lock the tube 28 [and the entire], *plus the other parts of the* adapter 10 *located to the right of line 60 in FIG. 1,* to the shaft 26. The tubular body section 14 is provided with a plurality of longitudinally extending circumferentially spaced slots 38 that divide it into longitudinally extending segments which by virtue of the resiliency of the material from which the [tube] *tubular body section 14* is made are able to expand outwardly at times as will be described below. The free ends of the segments of the tubular body *section* 14 between slots 38 are internally beveled at 40 with the bevel preceding centrally, i.e. toward the axis of the [tube] *tubular body section 14* in the direction of the fixed ends of the [tube] *tubular* segments separated by the slot 38. These segments can thus be moved at times outwardly against the inner surface of the coil making the [tube] *tubular body section* 14 expandable. The [tube] *tubular body section* 14 can thus be thought of as an expandable collet.

Mounted just to the left of the [tube] *tubular body section* 14 is a collet expander 42 having a conical expander surface 44 on its right end concentric with the center thereof and of the proper diameter and angular orientation to mate with the conical surface 40 of the [tube] *tubular body section* 14 so as to expand the segments of the [tube] *tubular body section 14* between slots 38 outwardly as the expander 42 is moved toward the right in the Figures. *It should be noted that this annular piece, here labeled "collet expander", is illustratively of a proper outer diameter so that it may—as discussed in the first paragraph under "SUMMARY OF THE INVENTION" and also as recited in claim 1 below—comprise part of the total composite tubular body member of the adapter. The composite tubular body member is a "bodying" mass exhibiting a generally cylindrical outer surface formed by the outer diameter axially extending surface of the expander 42 and the tubular body section 14.* The expander is provided with a central longitudinally extending threaded bore 46 which is threaded upon the screw threads 30 when the adapter is assembled. The expander includes longitudinally extending exterior slot 48 and a circumferentially extending slot 50 for a spring clip 52.

The circular flange 12 at the left is rigidly secured as by welding to a flange hub 54 having a tubular axially extending spring cover 54'. Inside the cover 54' is a helical compression spring 56 which abuts at its left end as shown in FIG. 3 against a washer 58 that is held in place on the collet expander by the spring clip 52 and presses at its right end against the inside surface 61 of the hub 54. As seen best in FIG. 3, a pin 62 is mounted in a radially extending bore of the flange hub so that its inner end is slidably engaged within the slot 48 to prevent the spring cover 54' and flange 12 from turning on the collet expander 42 so that the spring cover 54' can be used as a handle in assembling and disassembling the adapter.

The manner in which the invention is used will now be described. To assemble the adapter, the tubular body *section* 14 is slid onto the threaded tube 28 after removing set screw 36. The set screw is then replaced through bore 34 and the right hand or fixed flange 16 and [tube] *tubular body section* 14 now held in place by set screw 36 is placed on the shaft 26. The set screw 36 is then tightened against shaft 26 to secure *all parts of* the adapter *located to the right of line 60 in FIG. 1* in place on the shaft.

The left hand or removable portion of the adapter is assembled by the manufacturer by sliding the collet expander 42 into the flange hub 54, *thereby providing a projecting axis centered annular structure on flange 12, then* introducing spring 56 into the cover 54' and assembling the washer 58 and spring clip 52 on the expander 42. The pin 62 is then inserted far enough so that its inner end extends into slot 48. Thus, all of the parts to the right of line 60 in FIG. 1 will normally be assembled and handled as a single component. Likewise, the parts to the left of line 60 will be assembled and will normally remain assembled and handled as a single unit. When a coil 18 is to be placed on the adapter, the cover 54' is grasped manually and the hub 54 and flange 12 are turned about the central axis of the adapter thereby unscrewing the expander 42 from the screw threads 30 of the threaded tube 28 allowing the flange 12, the hub 54 and the expander 42 to be removed. The coil 18 either with or without the core 20 is then placed on [tube] *tubular body section* 14 so that its right hand surface abuts against the inner surface of the flange 16. The removable flange and its associated parts are then replaced on the threads 30 and the cover 54' is turned manually in a clockwise direction so as to tighten the collet expander on the threads until the conical spreading surface 44 engages the mating conical surface 40 of the collet 14 which then expands thereby forcing the segments of the [tube] *collet* 14 between the slots 38 outwardly into firm frictional engagement with the inner surface of the coil 18 or core 20 as the [cast] *case* may be. *(To be noted is that the screw threaded parts of both the fixed and removable assemblies are mating cooperatively threaded structures which circumscribe the line of the axis of shaft 26.)* As the unit is being assembled in this manner, the inner surface of the flange 12 will engage the mating flat side surface of the coil 18 and as the expander 42 continues to turn on threads 30, the engagement between the coil 18 and the flange 12 will force the flange 12 and the hub 54 back i.e., toward the left against the spring 56 which thus functions to resiliently urge the flange and hub against the coil 18. In this way, the flange 12 can be [though] *thought* of as a floating flange with resilient means for yieldably biasing it against the coil 18.

Thus, the invention provides a means for tightly engaging the adapter with the inside cylindrical surface of the coil as well as the flat side surfaces of the coil and will [accomodate] *accommodate* coils of different widths i.e., different distances between the flanges 12 and 16 since flange 12 floats on the adapter. Moreover, the spring 56 serves to provide a predetermined biasing force yieldably retaining the flanges in contact with the sides of the coil 18 regardless of its width. In addition, in spite of such variations in the size of the coils, the collet expander 42 will reliably engage and expand the free ends of the [tube] *collet* segments as required to hold the [tube] *collet segments* in engagement with the coil.

When the adapter is in use as shown in FIG. 2, the tie material 64 is withdrawn and fed over suitable guides such as wheels 66 and 68 upon which it travels to downstream equipment such as bread bag tying machines or the like. *Also evident from FIG. 2 and the foregoing description is the fact that, as tie material is so withdrawn as just noted, rotation of the coil of tie material as well as rotation of the elements of the reel adapter and the shaft 26 on which it is mounted all occur in the same rotary direction. This rotary direction is clockwise as one views FIG. 2, and is the same direction as the aforenoted clockwise direction for the threaded fastening of the removable flange. A feature of this relationship in bag tying machine operations is that of an inherent automatic effective yieldable biasing of any threadedly removable adapter flange in the direction of the other or fixed adapter flange, arising as a concommitant to the manner in which bag tying machine operations are conducted for bag tying.* The adapter can be used with a variety of tie materials. The term "tie material" as used herein is meant to indicate any elongated flexible or non-flexible tying material such as wire embedded in strips of paper or plastic as well as cord, twine, etc.

What is claimed is:

1. A reel adapter for supporting a coil of tie material, said adapter comprising a *tube having about it a* tubular body member generally in the form of a cylinder, a flange member located at each end of the tubular body member, the flange members being parallel and oriented normal to the axis of the tube, fastening means for removably securing at least one of the flanges on the tube so that the coil of tie material can be placed on the adapter and the removable flange replaced and said adapter having means thereon for engaging the wound coil of tie material to the adapter to prevent rotation of the tie material on the adapter, said [tube] *tubular body member* comprising an expandable collet having a plurality of longitudinally extending circumferentially spaced segments with notches between them, the segments being free at one end and integrally connected at the other end and a collet [expanding means] *expander* operatively associated with the free ends of the segments to press the segments outward when the removable flange is moved in the direction of the other flange, *said means for engaging the wound coil of tie material to the adapter comprising said expandable collet of said tubular body member,* and the adapter includes a means *thereupon* for retaining the removable flange and collet [expanding means thereupon] *expander operably connected as a single removable assembly.*

2. The apparatus of claim 1 wherein the *fastening* means for [retaining] *removably securing* the [collet expander] *removable flange* upon the [adapter] *tube* comprises an axially extending screw thread connection between the [removable flange] *collet expander* and the [adapter] *tube* whereby the removable flange and the collet expander can be unscrewed and removed *as a single assembly* from the [adapter] *tube* and replaced by being turned on the screw threads in the appropriate direction to move the *removable* flange and collet expander axially of the tube in the direction of the other flange until the collet expander contacts the free ends of the [tube] *collet* segments forcing them into contact with the inside surface of the coil to thereby securely retain the coil in place on the adapter.

3. The apparatus of claim 1 wherein [a] *said* collet expander is mounted concentrically within the removable flange, said collet expander includes a conical section at the end thereof closest to the [tubular body] *expandable collet*, the free ends of the segments of the [tube] *expandable collet* include a conical surface and the conical surface of the collet expander is of the appropriate size and angular orientation to mate with the conical surface at the ends of the [tube] *expandable collet* segments, the collet expander having an axial bore with screw threads therein and the other flange having a hub with *said tube extending therefrom as* a central axially extending screw threaded [tubular] *tube* member screw threaded into the threaded bore of the collet expander[.], *said fastening means for said removable flange comprising said screw threads of said axial bore of said collet expander and said screw threaded tube member of said other flange.*

4. The apparatus of claim 3 wherein the removable flange includes an axially extending spring cover, a spring mounted within the spring cover and operatively associated between the collet expander and the *removable* flange to yieldably bias the *removable* flange in the direction of the other flange and to yieldably bias the collet expander away from the other flange.

5. The apparatus of claim 4 wherein [operative connection] *said* means *for retaining the removable flange and collet expander operably connected* is [provided] between the removable flange and the collet expander [to allow] *and allows* the *removable* flange to slide axially of the collet expander but [preventing] *prevents* rotation of the *removable* flange with respect to the collet expander whereby the collet expander can be screw threaded onto [the adapter] *said screw threaded tube member* by manually grasping the spring cover.

6. A reel adapter for supporting a coil of tie material, said adapter comprising a *tube having about it a* tubular body member generally in the form of a [cyliner] *cylinder*, a flange member located at each end of the tubular body member, the flange members being parallel and oriented normal to the axis of the tube, fastening means for removably securing at least one of the flanges on the tube so that the coil of tie material can be placed on the adapter and the removable flange replaced and said adapter having means thereon for engaging the wound coil of tie material to the adapter to prevent rotation of the tie material on the adapter, one of said flanges is axially slidable *with respect to the tube* on the adapter and resilient means is provided for yieldably biasing said one flange in the direction of the other flange.

7. The apparatus of claim 6 wherein the fastening means for said one flange is a screw thread connector operatively associated between the removable flange and the other flange.

8. A reel adapter for supporting a coil of tie material, said adapter comprising a *tube having about it a* tubular body member generally in the form of a cylinder, a flange member located at each end of the tubular body member, the flange members being parallel and oriented normal to the axis of the tube, fastening means for removably securing at least one of the flanges on the tube so that the coil of tie material can be placed on the adapter and the removable flange replaced and said adapter having means thereon for engaging the wound coil of tie material to the adapter to prevent rotation of the tie material on the adapter, one of said flanges is fixed upon the adapter and the other flange is able to float axially of the tube and resilient means is operatively associated with the floating flange to yieldably bias the floating flange [upon] *of* the adapter in the direction of the other flange.

9. A method of supporting and controlling unwinding of a coil of tie material from a reel adapter having a [tube] *tubular* portion engagable with the coil to prevent rotation of the coil thereupon and a pair of flanges one of which flanges is removable, said method comprising, (a) placing the coil on said [tube] *tubular portion* such that one side surface of said coil abutts against the inner surface of one flange, (b) placing the removable flange on the adapter, (c) engaging the [tube] *tubular* portion with the coil so as to prevent rotation of the coil thereupon, (d) forcing the inner surface of said removable flange against the opposite side surface of the coil, (e) yieldably biasing at least one flange into engagement with the coil while the coil is on the adapter, and (f) thereafter unwinding the tie material from the coil while the [tube] *tubular portion* is thus engaged with the coil and one of the flanges is yieldably biased against the coil.

*10. In a bag tying operation, the method of supporting and controlling the withdrawal of tie ribbon from a flangeless coil structure having the tie ribbon wound in coil form with an inside surface and with the windings at opposite ends of the coil structure presenting a substantially flat surface, said method comprising*

*(a) forming a fixed assembly on a bag tying machine shaft means having a free end, said fixed assembly being rotatable about the axis of said shaft means and comprising a fixed flange oriented normal to the axis of said shaft means and having its inner surface facing the free end of said shaft means, and a screw threaded axis-circumscribing structure oriented inwardly of said inner surface of said fixed flange,*

*(b) placing said coil structure on said fixed assembly with one end surface of said coil structure abutting against said inner surface of said fixed flange, the other end surface of said coil structure being the outer end surface thereof,*

*(c) rotatably fastening a removable flange assembly to said fixed assembly with the inner surface of the flange of said removable flange assembly facing toward said fixed flange and also facing toward said outer end surface of said coil structure, said removable flange assembly having an axis-circumscribing structure equipped with screw threads matingly cooperative with said screw threaded structure of said fixed assembly, said rotatable fastening step consisting essentially of manually threadedly rotating said entire removable flange assembly onto said screw threaded structure of said fixed assembly to thereby move said removable flange assembly axially toward said fixed flange, with said manual threaded rotation and resulting axial movement continuing beyond mere abutting contact between said inner flange surface of said removable flange assembly and said outer end surface of said coil structure, and continuing despite the fact*

*that the rotation takes place under and causes increasing pressures of contact between said inner flange surface of said removable flange assembly and said outer end surface of said coil structure, until said flanges of said assemblies pressingly engage the opposite ends of said coil structure sufficiently to prevent windings of tie ribbon from slipping off said opposite ends during withdrawal of tie ribbon from said coil structure as well as until said coil structure is securely held against rotation with respect to said fixed assembly during withdrawal of tie ribbon from said coil structure, and*

*(d) withdrawing tie ribbon from said coil structure by drawing said tie ribbon over guide means toward a bag tying operation in a manner effecting rotation of said assemblies and said coil structure about the axis of said shaft means.*

*11. The method of claim 10 wherein said rotation of said assemblies and said coil structure during said step of withdrawing tie ribbon is in the same rotary direction as that employed in threadedly rotating said removable flange assembly during said rotatable fastening step.*

*12. The method of claim 10 wherein said rotation of said assemblies and said coil structure during said step of withdrawing tie ribbon is clockwise and wherein a clockwise rotation is employed in threadedly rotating said removable flange assembly during said rotatable fastening step.*

*13. The method of claim 10 additionally including the step of engaging the inside surface of said coil structure with a means radially outward from said shaft means.*

*14. Apparatus comprising a bag tying machine shaft, a reel adapter mounted on said shaft for rotation about the axis of said shaft, and a flangeless coil of wound tie ribbon having an inside surface and opposing flat ends supported on said reel adapter, said reel adapter comprising a tube member having an axial bore extending therethrough within which a bag tying machine shaft is receivable, said bag tying machine shaft being within said axial bore of said tube member, said tube member having an outer surface structure about it which constitutes the most radially outer surface structure along said tube member for reception within the inside surface of a flangeless coil of tie ribbon, said outer surface structure being within said inside surface of said flangeless coil, said outer surface structure being non-rotatable with respect to said tube member, a flange located at each end of said tube member, said flanges being parallel and oriented normal to said axial bore of said tube member and having an inner surface facing toward said tube member and having an axial bore aligned with said axial bore of said tube member, one of said flanges being fixed nonrotatably to said tube member, a removable flange assembly comprising the other said flange and consisting of parts so assembled that said removable flange assembly is manually handleable solely as a single unit in the removal and refastening of it, manually-operable fastening means for removably securing said removable flange assembly to said tube member in a manner solely permitting manual removal of said entire removable flange assembly as a single unit and the placement of a flangeless coil of tie ribbon over said tube member with said outer surface structure within the inside surface of the flangeless coil and then the manual fastening of said entire removable flange assembly as a single unit to said tube member, said fastening means consisting of matingly cooperative screw threads on said removable flange assembly and said tube member, whereby manual threaded rotation of said entire removable flange assembly with respect to said tube member is alone effective for fastening and removal of said removable flange assembly, said screw threads being effective to cause axial movement of said removable flange assembly toward said fixed flange during manual threaded fastening rotation of said entire removable flange assembly, and said reel adapter being characterized by the fact that it effectively firmly engages said flangeless coil supported on it for trouble free withdrawal of tie ribbon therefrom in a bag tying operation, said firm engagement being accomplished as a result of manual threaded fastening rotation and axial movement of said entire removable flange assembly beyond mere initial abutting contact of the inner surface of the flange of said removable flange assembly against the adjacent flat end of said flangeless coil about said tube member, the said firm engagement being effective to prevent tie ribbon from slipping off the flat ends of said flangeless coil and effective to prevent rotation of said flangeless coil with respect to said tube member.*

*15. Apparatus comprising a bag tying machine rotatable shaft, a reel adapter fixedly mounted on said rotatable shaft for rotation therewith, and a flangeless tie ribbon coil structure removably mounted on said reel adapter and supported thereby for substantially trouble free withdrawal of tie ribbon from said coil structure in a machine-conducted bag tying operation, wherein*

*(a) said coil structure consists essentially of a tubular core member having no end flanges and having an inside cylindrical surface, and a tie ribbon wound in coil form about said tubular core member with the windings at opposite ends of the coil structure presenting a substantially flat surface, said coil structure being a relatively stable structure for handling as a discrete article of commerce preliminary to the placement thereof as said removably mounted structure on said reel adapter, and*

*(b) said reel adapter consists essentially of a fixed assembly non-rotatable with respect to said rotatable shaft and a removable assembly which permits the replacement mounting of a said coil structure upon said reel adapter quickly and in a manner for said trouble free withdrawal of tie ribbon therefrom,*

*(i) said fixed assembly comprising a fixed circular flange member having an inner surface in firm pressing engagement against one end of said coil structure, and an engaging member within said tubular core member of said coil structure and firmly engaging the inside cylindrical surface of said tubular core member of said coil structure in a manner preventing said coil structure from turning on said fixed assembly, said fixed assembly having an axial bore extending therethrough within which said bag tying machine rotatable shaft extends,*

*(ii) said removable assembly comprising a circular flange member having an inner surface and having substantially the same flange diameter as said fixed flange member, said removable flange assembly having an axial bore extending therethrough and aligned with said axial bore of said fixed assembly, said inner surface of said flange member of said removable assembly being in firm pressing engagement with the end of said coil structure opposite the end thereof adjacent said flange member of said fixed assembly, and*

*(iii) said assemblies of said reel adapter being such that the distance between said flange members thereof can be manually adjusted while at the same time said coil structure removably mounted on said reel adapter is maintained engaged at its said inside cylindrical surface by said engaging member of said*

*fixed assembly so firmly that turning of said coil structure with respect to said fixed assembly is prevented by said engaging member as tie ribbon is withdrawn from said coil structure in a machine-conducted bag tying operation, said firm pressing engagement of said inner surfaces of said flange members of said assemblies being such that windings of tie ribbon of said coil structure are prevented from slipping off said opposing ends thereof as tie ribbon is withdrawn from said coil structure in a machine-conducted bag tying operation.*

*16. In a bag tying operation, the method of supporting and controlling the withdrawal of tie ribbon from a flangeless coil structure having an inside tubular core about which the tie ribbon is wound in coil form with the windings at opposite ends of the coil structure presenting a substantially flat surface, said method comprising*

*(a) forming a fixed assembly on a bag tying machine shaft means having a free end, said fixed assembly being rotatable about the axis of said shaft means and comprising a fixed flange oriented normal to the axis of said shaft means and having its inner surface facing the free end of said shaft means, and a means for engaging the inside of the tubular core of said coil structure, said engaging means being oriented inwardly of said inner surface of said fixed flange,*

*(b) placing said coil structure on said fixed assembly by sliding it coaxially about said shaft means until one end of said coil structure abutts against said inner surface of said fixed flange,*

*(c) engaging the inside of the tubular core of said coil structure with said engaging means of said fixed assembly so firmly that said coil structure is prevented from rotating with respect to said fixed assembly during withdrawal of tie ribbon from said coil structure,*

*(d) manually forcedly and pressingly engaging the inner surface of a removable flange against the opposite end of said coil structure with sufficient pressure toward said fixed flange to prevent tie ribbon from slipping off opposite ends of said coil structure, and maintaining said pressure condition during withdrawal of tie ribbon from said coil structure,*

*(e) then withdrawing tie ribbon from said coil structure, with simultaneous rotation of said coil structure and said assemblies all in the same rotary direction, by drawing said tie ribbon over guide means toward a bag tying operation,*

*(f) thereafter manually removing said removable flange with simultaneous rendering of said core of said coil structure completely accessible for easy removal from said fixed assembly simply by sliding it with or without rotation axially outward away from said fixed assembly, and*

*(g) removing said core of said coil structure by sliding it with or without rotation axially outward away from said fixed assembly.*

*17. The apparatus of claim 14 wherein said bag tying machine shaft is rotatable and wherein said tube member is fixed upon said shaft for rotation therewith about the axis of said shaft.*

* * * * *

UNITED STATES PATENT AND TRADEMARK OFFICE

CERTIFICATE OF CORRECTION

PATENT NO. : Re. 31,015

DATED : Aug. 24, 1982

INVENTOR(S) : Doyle A. Moore

It is certified that error appears in the above—identified patent and that said Letters Patent is hereby corrected as shown below:

Col. 4, line 9, which reads:

"either 171 rotated by a motor (not shown) or] allowed"

should read:

[either rotated by a motor (not shown) or] allowed

Signed and Sealed this

*Twenty-sixth* Day of *October 1982*

[SEAL]

*Attest:*

GERALD J. MOSSINGHOFF

*Attesting Officer*

*Commissioner of Patents and Trademarks*